Oct. 31, 1933.  M. C. GAUTHIER  1,933,251

PHOTOGRAPHIC FILM DRIVE MECHANISM

Filed April 10, 1931

INVENTOR
M. C. GAUTHIER
BY
G. H. Heydt.
ATTORNEY

Patented Oct. 31, 1933

1,933,251

UNITED STATES PATENT OFFICE 1,933,251

PHOTOGRAPHIC FILM DRIVE MECHANISM

Marcel C. Gauthier, Montclair, N. J., assignor to Bell Telephone Laboratories, Incorporated, New York, N. Y., a corporation of New York Application April 10, 1931. Serial No. 529,004

7 Claims. (Cl. 179—100.3)

This invention relates to improvements in photographic film drive mechanisms and more particularly to an improved mechanism for guiding a film at the exposure aperture of a sound film recording or reproducing mechanism.

The object of this invention is to provide an improved film guide which will safeguard against scratching or other damage to the film as it is moved past the exposure point of a photographic recording or reproducing device.

In the majority of film drive mechanisms now in use the film is fed over either a straight or curved aperture plate at the exposure point. In the use of a straight plate additional means, in the form of presser feet, are usually provided to hold the film flat on the plate. It has been found, particularly in connection with sound picture work, that scratching of the film emulsion or other damage to the film results from its rubbing against the stationary surfaces when either of the above forms of the stationary aperture plate is used. It is desirable, particularly in sound picture systems, to have the film fed to the exposure point or light beam in a right line free from contact with stationary surfaces.

In accordance with this invention a film drive mechanism is provided in which the film is guided to the light beam at the exposure point in a right line free from contact with stationary surfaces. More specifically, there is provided a film drive mechanism in which the film is guided through the projected light beam by two freely rotatable rollers displaced vertically a distance sufficient to allow the passage of a horizontal light beam therebetween and displaced horizontally a distance sufficient to allow the passage of the film vertically between their opposite peripheries. The rollers, which rotate in response to the movement of the film, contact with opposite sides of the film, one above and one below the optical axis. As the film is moved by a suitable driving means, the rollers will guide the film in a right line through the projecting light beam and as all stationary surfaces are eliminated, there will be no scratching of the emulsion of the film.

In the drawing, Fig. 1 is a portion of a sound film reproducing machine as shown in perspective.

Figure 1:
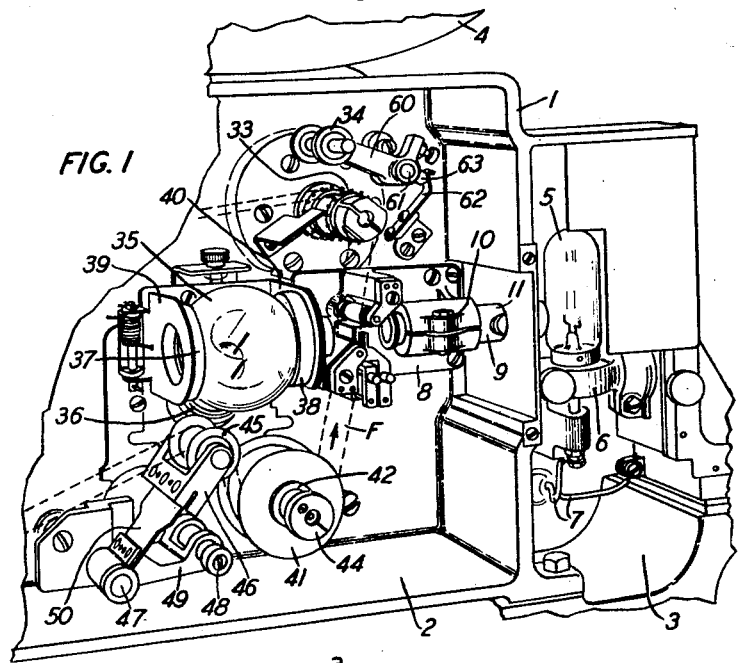

In Fig. 1 is shown a portion of a sound film reproducer machine having a casing 1 divided into two compartments 2 and 3. Film feed and take-up reels are mounted on the top of casing 1, part of the take-up reel 4 being shown. Compartment 3 contains an exciting lamp 5 located in a mounting 6 connected to a source of supply through wires 7.

On the wall of casing 1 in compartment 2 is secured an attachment 8 on which a lens tube 9 is mounted by means of a clamp 10. One end of tube 9 extends through the compartment wall at 11 and is located adjacent lamp 5.

Figure 2:
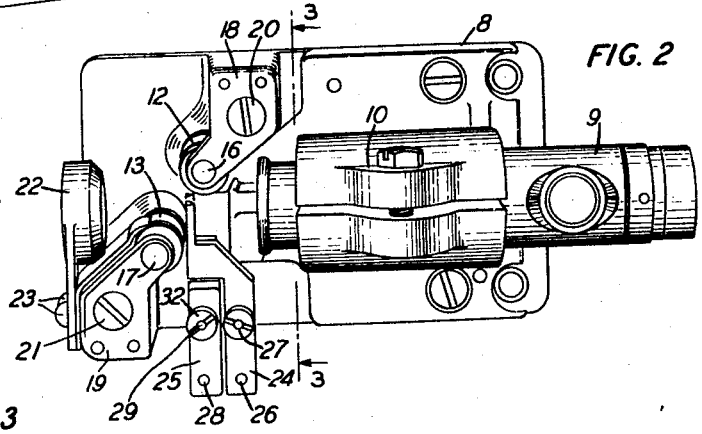
Fig. 2 is a detail of the unit attachment bearing the film drive, lens tube and adjustable masking device.
Figure 3:
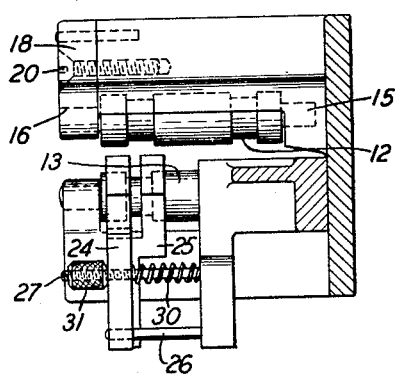
Fig. 3 is a section of the unit attachment taken through line 3—3 of Fig. 2.

The film guide provided in accordance with this invention to prevent damage to the film and present the film at the light beam in a right line comprises two rollers 12 and 13 forming a guide for the film at the point where the light beam passes through the film. These rollers are mounted on the attachment 8 to rotate freely thereon. As shown in Figs. 2 and 3 an end bearing surface 15 of roller 12 extends into a recess in the wall of attachment 8. The other end bearing surface 16 of roller 12 and the bearing surface 17 of roller 13 extend into bearings in the bracket arms 18 and 19 secured to the attachment by screws 20 and 21 respectively. A lens holder 22 is secured to attachment 8 by means of screw 23.

Located between the lens tube 9 and the film guide is an adjustable masking device consisting of two masking elements 24 and 25. The masking element 24 is slidably mounted on rods 26 and 27 while the element 25 is slidably mounted on rods 28 and 29. The masking element 24 is moved along the rods against the action of a spring 30 on rod 27 by means of a knurled nut 31. Masking element 25 is moved against the action of a similar spring (not shown) mounted on rod 29, by means of a knurled nut 32. It can readily be seen that these masking elements may be moved independently to permit the forming of a light aperture of any desired width opposite any portion of the photographic film. By the use of the masking element described, the length of the light beam projected onto the film may be accurately restricted to cover only the width of the sound record on the film thereby preventing reproduction of extraneous sounds caused by light reaching the photoelectric cell which has been projected through other portions of the film outside the photographic record.

A constant speed film drive sprocket 33 is provided for driving a sound picture film F in the direction indicated by the arrow. Cooperating with this sprocket 33 is a film retaining roller 34, shown in disengaged position, for maintaining the film in engagement with the sprocket. Roller 34 is rotatably mounted on an arm 60 pivoted at 61. A spring member 62 secured to the wall of casing 1 bears against a wedge-shaped extension 63 of arm 60 to maintain the roller 34 in engaged or disengaged position.

A photoelectric cell 35 in mounting 36 is located adjacent the film on the side opposite the lens tube 9. Pads 37 and 38 mounted on spring held metal arms 39 and 40 respectively, prevent any vibration in the cell which might be caused by the film feed mechanism. Numeral 41 designates a tension or hold-back roller around which the film travels before it is passed to the film guide. This roller rotates against the friction generated by means of a spring pressed friction disc 42. Movement of the film in response to the sprocket 33 causes movement of the roller 41. The friction exerted by the disc 42 may be regulated by nut 44. Tension roller 41 tends to hold the film back to produce a tension therein sufficient to insure steady travel of the film through the light beam and to eliminate vibration of the film at the exposure aperture. Oscillations, or minute variations in film speed have been found to be caused by irregularities in the gear teeth of the gears forming part of the driving connection to the flywheel. As the flywheel is connected through a mechanical filter device to the constant speed sprocket 33, any vibrations caused by the gear teeth will set up oscillations in the flywheel which in turn will be transmitted to the film by constant speed sprocket 33. For the purpose of damping out such oscillations applicant provides the drag or tension roller 41 in combination with the constant speed sprocket 33. The tension roller 41 is arranged in the film drive to engage the film at a point preceding its passage through the light beam so that any oscillation set up in the film by the constant speed sprocket will be damped out by this tension roller. The means for producing a drag or tension in the roller 41 may be a spring pressed friction disc as shown or may take the form of a viscous oil drag unit applied to this roller.

A retaining roller 45, shown in disengaged position, is rotatably mounted on one arm 46 of a bell crank lever pivoted at 47. A member 48 mounted on arm 49 serves as a means for moving the bell crank lever about the pivot 47 to bring the roller 45 in engagement with the tension roller 41. A leaf spring 50 forms part of arm 46 to allow the roller 45 to yield slightly under an abnormal tension in the film. It will be seen that by movement of the roller 45 into engaged position, the film is made to contact with the major portion of the circumference of roller 41 which insures that roller 41 is driven without film slippage, and that the necessary tension is produced to insure steady travel of the film at the exposure point.

By proper location of the roller 41 and the sprocket 33 with respect to the film guide rollers 13 and 12, a constant pressure of the film against these guide rollers, sufficient to cause them to rotate in response to the movement of the film, is insured.

Figure 4:
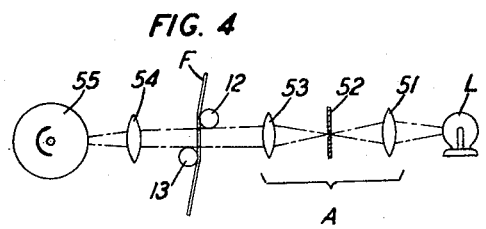
Fig. 4 is a diagrammatic view showing the relation of the film guide through the optical system and light beam.

Referring to Fig. 4 the location of the rollers with respect to the optical light beam is diagrammatically shown. L designates an exciting lamp. The elements included in the bracket A represent the optical system as included in lens tube 9. A lens 51 focuses the light beam onto a fixed slit in member 52. Lens 53 projects an image of the slit formed in member 52 onto the film between the rollers 12 and 13. Lens 54 is employed to focus the light beam projected through the film onto a photoelectric cell 55 connected in the sound reproducing circuit. The rollers 11 and 12 are displaced horizontally an amount such that their opposite peripheries are spaced apart a distance substantially equal to the thickness of the photographic film generally employed. The vertical displacement of the guide rollers is such that their opposite peripheries will be spaced apart a distance substantially equal to the height of the light beam as determined by the optical system included in the bracket A. It will therefore be seen that the length of film supported between the rollers 12 and 13 is only slightly greater than the length of the sound record to be effected by the projected light beam.

It is obvious from the above description of the film drive mechanism forming the subject matter of this invention that no damage to the film results from its contacting with the guiding surfaces or rollers which present it to the light beam at the exposure point in a right line.

What is claimed is:

1. The combination in an optical system, of a film bearing a photographic sound record, means for producing a beam of light, optical means for focussing said beam of light on the sound record portion of said film, a pair of vertically displaced freely rotatable guide rollers engaging opposite sides of said film, one above and one below said focussed light beam, means for moving said film located above said guide rollers, tension means engaging said film below said guide rollers, said film moving means and said tension means being horizontally displaced in opposite directions with respect to said guide rollers to maintain said film in contact with the surfaces of said guide rollers.

2. The combination in a sound film recording and reproducing system, of means for producing a beam of light, a film, means for moving said film through said light beam at a constant speed, means for damping oscillations in said film caused by said film moving means, and means located between said damping means and said film moving means for guiding said film through said light beam, said means comprising a pair of vertically displaced freely rotatable guide rollers engaging opposite sides of said film, one above and one below said light beam.

3. The combination in a sound film recording and reproducing system of means for producing a beam of light, a film, means for moving said film at constant speed, means for guiding said film through said light beam in a right line, said means comprising a plurality of vertically displaced freely rotatable rollers, means for damping oscillations in said film caused by said film moving means, said means comprising a tensioned roller engaging said film at a point preceding its engagement with said guide rollers.

4. The combination in a sound film recording and reproducing system, of means for producing a beam of light, a film, means for moving said film through said light beam at a constant speed, means for damping oscillations in said film caused by said film moving means, and means located between said damping means and said film moving means for guiding said film through said light beam, said means comprising a pair of freely rotatable guide rollers displaced longitudinally with respect to said film and engaging opposite sides thereof, at opposite sides of said light beam.

5. The combination in a sound film recording and reproducing system, of means for producing a beam of light, a film, means for moving said film at constant speed, means for guiding said film through said light beam in a right line, said means comprising a plurality of freely rotatable rollers displaced longitudinally with respect to said film, means for damping oscillations in said film caused by said film moving means, said means comprising a tensioned roller engaging said film at a point preceding its engagement with said guide rollers.

6. The combination in an optical system, of a film bearing a photographic sound record, means for producing a beam of light, optical means for focussing said beam of light on the sound record portion of said film, a pair of vertically displaced freely rotatable guide rollers engaging opposite sides of said film, one above and one below said focussed light beam, means for moving said film located above said guide rollers, tension means engaging said film below said guide rollers, said film moving means and said tension means being displaced in opposite directions from the plane of the film path through said guide rollers to maintain the film in contact with the surfaces of said guide rollers.

7. The combination in an optical system, of means for producing a beam of light, a film, a pair of freely rotatable guide rollers displaced longitudinally with respect to said film and engaging opposite sides thereof, on opposite sides of said light beam, film moving means engaging said film following its engagement with said guide rollers, tension means engaging said film preceding its engagement with said guide rollers, said film moving means and said tension means being displaced in opposite directions from the plane of the film path through said guide rollers to maintain said film in contact with the surfaces of said guide rollers.

MARCEL C. GAUTHIER.